United States Patent [19]

Castel

[11] Patent Number: 5,201,572
[45] Date of Patent: Apr. 13, 1993

[54] CIRCUIT CONTROLLING A FLUIDICALLY CONTROLLED BRAKE REGULATOR

[75] Inventor: Philippe Castel, Paris, France

[73] Assignee: Bendix Europe Services Techniques, Drancy, France

[21] Appl. No.: 606,976

[22] Filed: Oct. 31, 1990

[30] Foreign Application Priority Data

Nov. 30, 1989 [FR] France ................... 89 15771

[51] Int. Cl.⁵ .............................. B60T 8/18
[52] U.S. Cl. .................... 303/22.5; 188/195; 180/282
[58] Field of Search ............. 303/22.1–22.8, 303/9.69; 188/195; 180/282

[56] References Cited

U.S. PATENT DOCUMENTS

| | | | |
|---|---|---|---|
| 3,357,512 | 12/1967 | Wilson | 267/186 |
| 3,707,313 | 12/1972 | Michellone et al. | 188/195 |
| 3,844,624 | 10/1974 | Jones | 303/100 |
| 4,119,353 | 10/1978 | Bihlmaier | 303/22.5 |
| 4,583,790 | 4/1986 | Scott | 303/22.2 |
| 4,824,180 | 4/1989 | Levrai | 188/195 |
| 4,986,609 | 1/1991 | Cole et al. | 303/22.5 |

FOREIGN PATENT DOCUMENTS

| | | | |
|---|---|---|---|
| 2701003 | 7/1977 | Fed. Rep. of Germany . | |
| 3444416 | 6/1986 | Fed. Rep. of Germany | 188/195 |
| 3702732 | 8/1988 | Fed. Rep. of Germany . | |
| 3727099 | 2/1989 | Fed. Rep. of Germany . | |
| 1277661 | 10/1961 | France | 303/22.1 |
| 2369131 | 6/1978 | France | 303/22.5 |
| 0001615 | 1/1989 | Japan | 188/195 |
| 0182522 | 7/1990 | Japan | 188/195 |
| 0193321 | 12/1964 | Sweden | 303/22.5 |

Primary Examiner—Robert J. Oberleitner
Assistant Examiner—Chris Schwartz
Attorney, Agent, or Firm—Larry J. Palguta; Ken C. Decker

[57] ABSTRACT

The circuit controlls a fluidically controlled brake regulator (7) in dependence on the load of a vehicle having at least two wheels each provided with a suspension member (1, 2). Each suspension member (1, 2) cooperates with a fluidic pressure sensor (11, 12) to control the regulator (7) in dependence on the load carried by only one of the wheels, namely the wheel carrying the lighter load.

3 Claims, 1 Drawing Sheet

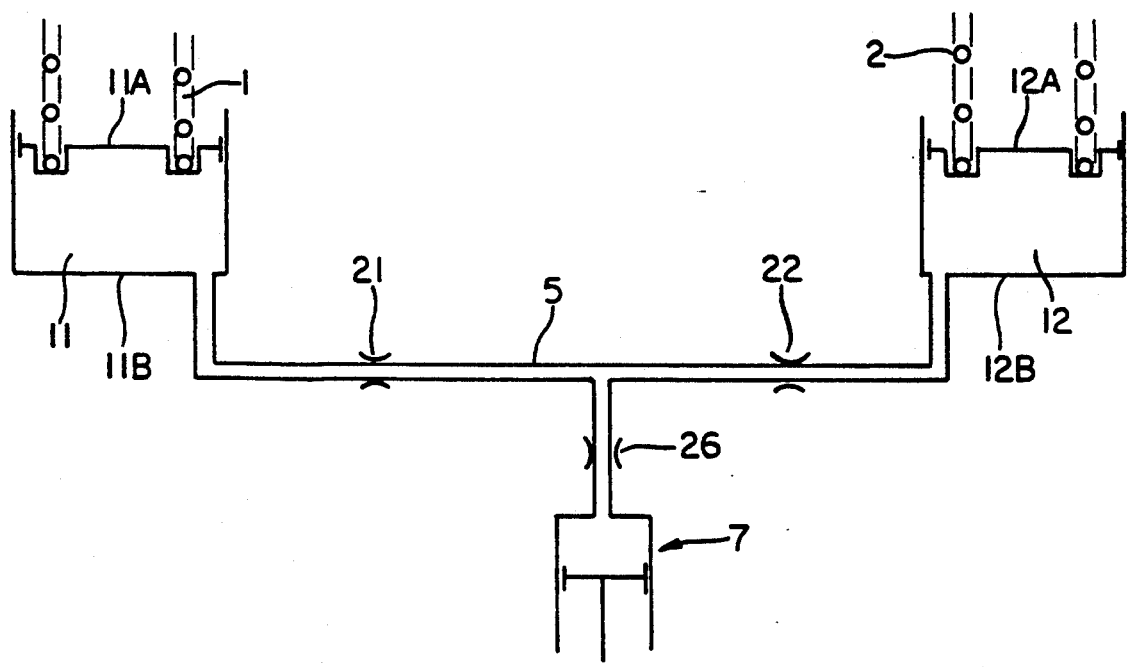

CIRCUIT CONTROLLING A FLUIDICALLY CONTROLLED BRAKE REGULATOR

BACKGROUND OF THE INVENTION

The present invention relates to a circuit controlling a fluidically controlled brake regulator in dependence on the load of a vehicle having at least two wheels each provided with a suspension member. from EP-A-0,223,641, to which reference may be made in particular with regard to the functioning of a regulator of this kind.

A fluidic pressure sensor cooperating with a suspension member in controlling a brake regulator is known from EP-A-0,283,328.

GB-A-1,542,507 a system controlling a mechanically controlled brake regulator in dependence on the load applied to a vehicle wheel and regulated pneumatically in dependence on the trim of the vehicle is known. This system is relatively complex and thus expensive to produce and to install in a vehicle. In addition, the brake regulation is dependent on the load applied to a single wheel selected arbitrarily. However, this wheel is not necessarily the one which is critical for making the brake regulation. In the case of unbalanced distribution of loads at the rear of the vehicle, or in the case of partial dynamic transfer of load from one side of the vehicle to the other—as occurs when the vehicle corners—the information supplied to the regulator may then be representative of the half-shaft to which the greater load or the load transfer is applied. The brake regulation applied to the other wheel then corresponds to a load greater than the actual load. There is thus a risk of locking the more lightly loaded wheel unless the intervention points are shifted by a value equal to the amplitude of the potential risk, which entails a substantial reduction of the braking efficiency on the rear axle. A regulation is thus obtained which is not always the best possible regulation.

SUMMARY OF THE INVENTION

The present invention seeks to obviate these disadvantages.

According to the invention each wheel suspension member cooperates with a fluidic pressure sensor to control the regulator in dependence on the load carried by only one of the wheels, namely the wheel carrying the lighter load.

In one embodiment of the circuit according to the invention the pressure sensors are connected to one another and to the regulator. Each sensor comprises a chamber whose volume is variable between a value substantially equal to zero and a determined maximum value, and the circuit is filled with a volume of fluid such that the volume of the chamber of one of the sensors is substantially equal to the maximum value when that of the other sensors is zero.

BRIEF DESCRIPTION OF THE DRAWING

The invention will be better understood and other aims, advantages and features will emerge more clearly on perusal of the following description of a preferred embodiment, which is given without constituting a limitation and which is accompanied by one sheet of drawings, in which:

the single figure shows schematically a circuit according to the invention.

DETAILED DESCRIPTION OF THE INVENTION

Referring now to this figure, suspension members 1, 2 are each supported on a fluidic pressure sensor 11, 12. These pressure sensors may have a toric shape or any other shape appropriate for their purpose of converting the force applied to them into a fluid pressure. This force is here that generated by the load supported by a half-shaft.

As can be seen, the two pressure sensors 11 and 12 are connected together by a pipe 5, which in turn is connected to the control chamber of a fluidically controlled brake regulator 7.

The fluidic pressure sensors 11, 12 each determine a chamber whose volume can vary between a value substantially equal to zero and a determined maximum value, and the fluidic circuit is filled with a volume of fluid such that when the volume of one of these chambers is substantially equal to zero, that of the other chamber is substantially equal to said determined maximum value.

The circuit functions as follows:

As shown in the figure, it will be assumed that the loads applied to each of the wheels are equal, the vehicle being unladen. The volume of both chambers is therefore substantially equal to half said determined maximum value.

With the vehicle no longer unladen, when the load applied to one of the wheels is greater than that applied to the other wheel the corresponding pressure sensor is crushed and the fluid passes to the other side. The result is that one of the chambers has a volume equal or substantially equal to zero, while that of the other chamber reaches a maximum value determined by the load supported by the wheel receiving the lighter load.

On the side on which the chamber has a volume substantially equal to zero, the force created by the load is exerted directly on the fixed bottom part of the sensor by direct mechanical connection and has no effect on the pressure of the fluid.

On the side on which the chamber has substantially the maximum volume the fluidic pressure sensor is completely interposed between the movable part and the fixed part (for example, parts 11A and 11B respectively) of this sensor. The fluid pressure is thus determined entirely by the ratio of this force to the effective area of this sensor.

When variations of load on the rear half-shafts occur, the pressures evolve towards their new equilibrium values. In the transition period the instantaneous values vary in accordance with the losses of load in the connection between the two sensors.

In order to prevent the regulator from being subjected to the rapid variations of pressure due, for example, to shocks transmitted by the suspension members, restriction means 21, 22 are advantageously disposed between each of the sensors and the junction point between the sensors and the regulator.

In another embodiment these rapid pressure variations are damped by a restriction means 26 disposed between the regulator and the junction point of the sensors.

In one example use is made of a fluidic pressure sensor of a height of about 3 mm, in order to avoid substantially amplifying the list of the vehicle in the event of unbalance in the distribution of loads inside the vehicle.

Those versed in the art will obviously be able to make numerous modifications without departing from the scope of the present invention as defined in the accompanying claims.

What we claim is:

1. A circuit controlling a fluidically controlled brake regulator in dependence on the load of a vehicle having at least two suspension members, each suspension member cooperating with a respective fluidic pressure sensor to control said brake regulator in dependence on the load carried by only one of the suspension members, namely the suspension member carrying the lighter load, wherein the pressure sensors are connected to one another and to said regulator and each sensor located apart from said regulator, each of said sensors comprising a variable-volume chamber whose volume is variable between a value substantially equal to zero and a predetermined maximum value, and wherein the circuit containing the sensors and the regulator is filled with a volume of fluid such that the volume of the variable-volume chamber of one sensor is substantially equal to said predetermined maximum value when the volume of the variable-volume chamber of the other sensor is substantially equal to zero during which the regulator operates responsively to the one sensor and the suspension member carrying the lighter load.

2. The circuit controlling a brake regulator according to claim 1, wherein restriction means is disposed between each of said sensors and a junction point of the sensors and the regulator.

3. The circuit controlling a brake regulator according to claim 1, wherein restriction means is disposed between a junction point of the sensors and the regulator.

* * * * *